US009742532B2

(12) United States Patent
Zhao et al.

(10) Patent No.: US 9,742,532 B2
(45) Date of Patent: Aug. 22, 2017

(54) METHOD, SYSTEM AND DEVICE FOR USING TERMINAL IDENTIFIER

(75) Inventors: Yi Zhao, Beijing (CN); Jing Liang, Beijing (CN); Haitao Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 13/389,802

(22) PCT Filed: Aug. 12, 2010

(86) PCT No.: PCT/CN2010/075944
§ 371 (c)(1),
(2), (4) Date: Feb. 9, 2012

(87) PCT Pub. No.: WO2011/018043
PCT Pub. Date: Feb. 17, 2011

(65) Prior Publication Data
US 2012/0140638 A1 Jun. 7, 2012

(30) Foreign Application Priority Data
Aug. 14, 2009 (CN) .......................... 2009 1 0091263

(51) Int. Cl.
*H04L 5/00* (2006.01)
*H04W 8/26* (2009.01)

(52) U.S. Cl.
CPC .............. *H04L 5/001* (2013.01); *H04W 8/26* (2013.01)

(58) Field of Classification Search
None
See application file for complete search history.

(56) References Cited

U.S. PATENT DOCUMENTS

| 8,326,292 B2 * | 12/2012 | Lin ............................... 455/434 |
| 2008/0019320 A1 * | 1/2008 | Phan et al. ..................... 370/331 |
| 2008/0261600 A1 * | 10/2008 | Somasundaram et al. ... 455/436 |

(Continued)

FOREIGN PATENT DOCUMENTS

| CN | 1343422 A | 4/2002 |
| CN | 1343433 A | 4/2002 |

(Continued)

OTHER PUBLICATIONS

Magnus Lindstrom, 3GPP-LTE Radio Layer 2 and RRC aspects, Dec. 17-18, 2009.*

(Continued)

*Primary Examiner* — Tejis Daya
(74) *Attorney, Agent, or Firm* — Handal & Morofsky LLC

(57) ABSTRACT

The embodiments of the present invention disclose a method, a system and a device for using a user equipment identity, and the method includes: the network side configures, for a user equipment performing carrier aggregation, the uniform Radio Network Temporary Identity (RNTI)(s) in the cell where the carrier aggregation is performed; the network side and the user equipment perform data reception and transmission using the uniform RNTI(s) configured in the cell where the carrier aggregation is performed. By the invention, a user equipment with carrier aggregation technology is able to perform the data reception and transmission with each cell using the RNTI(s).

23 Claims, 7 Drawing Sheets

(56) References Cited

U.S. PATENT DOCUMENTS

| | | | |
|---|---|---|---|
| 2008/0273482 A1* | 11/2008 | Lee et al. | 370/312 |
| 2009/0186613 A1 | 7/2009 | Ahn et al. | |
| 2009/0257398 A1* | 10/2009 | Koyanagi et al. | 370/331 |
| 2010/0067495 A1* | 3/2010 | Lee et al. | 370/335 |
| 2010/0098050 A1* | 4/2010 | Yamada et al. | 370/350 |
| 2010/0202288 A1* | 8/2010 | Park et al. | 370/230 |
| 2010/0227569 A1* | 9/2010 | Bala et al. | 455/73 |
| 2010/0240372 A1* | 9/2010 | Wu | 455/436 |
| 2010/0304748 A1* | 12/2010 | Henttonen et al. | 455/436 |
| 2010/0318871 A1* | 12/2010 | Lee et al. | 714/749 |
| 2010/0331037 A1* | 12/2010 | Jen | 455/522 |
| 2011/0035616 A1* | 2/2011 | Henry et al. | 714/2 |
| 2011/0075629 A1* | 3/2011 | Seo et al. | 370/330 |
| 2011/0134877 A1* | 6/2011 | Noh | H04L 5/001 370/329 |
| 2013/0010964 A1* | 1/2013 | Fong et al. | 380/277 |

FOREIGN PATENT DOCUMENTS

| | | |
|---|---|---|
| CN | 1367974 A | 9/2002 |
| CN | 1863384 A | 11/2006 |
| CN | 101384074 A | 3/2009 |
| CN | 101478808 A | 7/2009 |
| CN | 101478822 A | 7/2009 |
| EP | 2429242 A1 | 3/2012 |
| KR | 20030004945 A | 1/2003 |
| KR | 20090008445 A | 1/2009 |
| WO | WO 2009082333 A1 | 7/2009 |
| WO | 2010146972 A1 | 12/2010 |

OTHER PUBLICATIONS

Ericsson, Intra-LTE Mobility Procedure, R3-061489, Oct. 10-13, 2006.*

International Search Report issued International Application No. PCT/CN2010/075944, dated Nov. 18, 2010.

Office Action issued in Japanese Patent Application No. 2012-524097, dated Jun. 11, 2014 (In Japanese).

Office Action issued in Japanese Patent Application No. 2012-524097, dated Jun. 11, 2014 {In English).

Office Action issued in Korean Patent Application No. 10-2011-7030049, dated Sep. 9, 2013 {In Korean).

Office Action issued in Korean Patent Application No. 10-2011-7030049, dated Sep. 9, 2013 {In English).

3GPP TSG RAN WG2 Meeting #66bis, CATT, Handover for Carrier Aggregation, R2-093722, dated Jun. 29-Jul. 3, 2009.

TSG-RAN WG2#68bis, R2-100397, Alcatel-Lucent Shanghai Bell, Alcatel-Lucent, C-RNTI allocation in CA scenario, dated Jan. 18-22, 2009.

3GPP TSG RAN WG2 #63, R2-084263, CATT, Allocation of SPS C-RNTI, Discussion and Decision, Jeju Korea, Aug. 18-22, 2008.

3GPP TSG-RAN WG2 Meeting #66bis, ZTE, Management of Component Carriers in CONNECT, Discussion and Decision, R2-093884, Los Angeles, USA, Jun. 29-Jul. 3, 2009.

Written Opinion of The International Searching Authority issued in PCT/CN2010/075944, dated Nov. 18, 2010.

Office Action issued in Chinese Patent Application No. 200910091263.7, dated Feb. 4, 2013 (In Chinese).

Office Action issued in Chinese Patent Application No. 200910091263.7, dated Feb. 4, 2013 (In English).

Office Action issued in Japanese Patent Application No. 2012-524097, dated Aug. 28, 2013 (In Japanese).

Office Action issued in Japanese Patent Application No. 2012-524097, dated Aug. 28, 2013 (In English).

Office Action issued in Japanese Patent Application No. 2012-524097, dated Jun. 11, 2014 (In English).

Office Action issued in Korean Patent Application No. 10-2011-7030049, dated Sep. 9, 2013 (In Korean).

Office Action issued in Korean Patent Application No. 10-2011-7030049, dated Sep. 9, 2013 (In English).

ZTE, "Management of Component Carriers in CONNECT", R2-093884, 3GPP TSG-RAN WG2 Meeting #66bis; Los Angeles, USA, Jun. 29-Jul. 3, 2009.

3GPP TS 36.321, V8.6.0(Jun. 2009); 3rd Generation Partnership Project; Technical Specification Group Radio Access Network; Evolved Universal Terrestrial Radio Access (E-UTRA) . . . .

European Patent Office; Extended European Search Report; Sep. 16, 2016.

* cited by examiner

| RNTI | Cell 1 | Cell 2 | Cell 3 |
|---|---|---|---|
| 0009 | UE1 C-RNTI | | |
| 0011 | | UE2 C-RNTI | |
| 0013 | | UE3 C-RNTI | |
| 0017 | | UE4 C-RNTI | |
| 0019 | | UE2 SPS C-RNTI | |

METHOD, SYSTEM AND DEVICE FOR USING TERMINAL IDENTIFIER

The present application claims the priority of the Chinese patent application with the application date of Aug. 14, 2009, the application number of 200910091263.7, and the patent name of "A Method, System and Device for Using User Equipment Identity", all content of the priority application is combined into the present application by quoting.

FIELD OF THE PRESENT INVENTION

The present invention relates generally to the field of wireless communication technology, and more particularly to a method, system and device for using a user equipment identity.

BACKGROUND OF THE PRESENT INVENTION

In LTE system, PRB (Physical Resource Block) corresponding to resource scheduling messages (e.g.: MCS (Modulation and Coding Scheme)) of uplink and downlink sends on PDCCH (Physical Downlink Control Channel), therefore, distinguishing the scheduling messages for paging message, system message, and PDSCH (Physical Downlink Shared Channel) or PUSCH which relates with data of user equipment, are necessary, reference to FIG. 1. Using the way which configures different RNTI (Radio Network Temporary Identity) for different scheduling messages to instruct the distinction, comprising in the processes which user equipment makes random access, cell handover, performing normal data reception and transmission and carrier aggregation. Thereinto, cell handover between eNB (Evolved Node-B) need to interact through signaling of X2 or S1 interface, the process is shown that source cell sends handover request message to target cell; target cell returns handover request response message to source cell (handover request response message comprises handover command which source cell sends to user equipment); source cell sends handover command to user equipment; user equipment makes configuration according to handover command; sending handover complete message to target cell when configuration has finished. Handover command which source cell sends to user equipment comprises RRC (Radio Resource Control) connection reconfiguration message including the mobility control information. Handover complete message which user equipment sends to target cell is RRC connection reconfiguration complete message. In the LTE system, user equipment also need cell handover when it moves at cells under the same eNB. The source cell and the target cell is different from cell handover under eNB, it is not required on the interaction of signaling through X2 or S1, other process is same process as said process, i.e.: source cell sends handover command to user equipment; user equipment configures according to handover command, sending handover complete message to target cell when configuration has finished.

In general, during the user equipment receiving, testing whether the PDCCH exist any RNTI which needs to receive. If so, according to the corresponding DCI (Downlink Control Information) directions to receive the contents of the corresponding data. P-RNTI (Paging RNTI) corresponding to the paging message; SI-RNTI (System Information RNTI) corresponding to the system information; C-RNTI (Cell Radio Network Temporary Identity) corresponding user equipment information on the PDSCH and PUSCH; SPS C-RNTI (Semi-Persistent Scheduling C-RNTI) corresponding user equipment information for the semi-continuous scheduling; TPC-PUSCH-RNTI (Transmission Power Control PUSCH RNTI) and TPC-PUCCH-RNTI corresponding PUCCH and PUSCH's power control information. But Temporary C-RNTI just exist in the case of the user equipment having no C-RNTI, the network will configure a temporary user equipment identity. When the user equipment come into the connected state through random access, the user equipment will set the Temporary C-RNTI which the network configured as it own C-RNTI. RA-RNTI is differences with other RNTIs which mention above. Others are used to indicate the UE identity; the RA-RNTI is to identify the resource block UE used when UE make random access and send preamble. For above RNTIs, the RNTI which can corresponds to a single user equipment RNTI are the C-RNTI and SPS C-RNTI. Of which C-RNTI is used to uniquely identity a UE RRC connected state in a cell. When the user equipment detected the corresponding C-RNTI on the PDCCH, the user equipment receives or sends data in the location of resource indicated in DCI corresponding to the C-RNTI. SPS C-RNTI has the same usage with C-RNTI, while UE is configured SPS C-RNTI only when it uses the way of Semi-Persistent Scheduling.

In process to achieve the present invention, the inventor finds that there are at least the following problems in the existing technology:

In the LTE system, user equipment receives and sends data with only one cell at the same time. Each cell configures RNTI for the user equipment which locates in the cell, such as: C-RNTI, SPS C-RNTI, and so on. User equipment receives scheduling messages from network side through detecting RNTI of PDCCH. In LTE-A system, when multiple cells are available for carrier aggregation, the user equipment which uses carrier aggregation technology can communicate with many cells at same time, while user equipment can't determine how to receive scheduling messages from multi-cells through RNTI at this moment.

SUMMARY OF THE PRESENT INVENTION

The embodiment of the present invention provides a method, system, device for using a user equipment identity, so as to make user equipment which uses carrier aggregation technology perform data reception and transmission with each cell through RNTI(s).

The embodiment of the present invention provides a method for using user equipment identity, comprising:

the network side configuring, for a user equipment performing carrier aggregation, uniform RNTI(s) in the cell where the carrier aggregation is performed;

the network side and the user equipment performing data reception and transmission using the uniform RNTI(s) configured in the cell where the carrier aggregation is performed.

The embodiment of the present invention provides a system for using user equipment identity, comprising:

network side, configuring, for a user equipment performing carrier aggregation, uniform RNTI(s) in the cell where the carrier aggregation is performed; performing data reception and transmission with said user equipment using the uniform RNTI(s) configured in said cell where the carrier aggregation is performed.

user equipment, receiving uniform RNTI(s) which said network side configures for said user equipment; performing data reception and transmission with said network side using the uniform RNTI(s) configured in the cell where the carrier aggregation is performed.

The embodiment of the present invention provides a network side device, comprising:

configuration module, is used for configuring, for a user equipment performing carrier aggregation, uniform RNTI(s);

reception and transmission module, is used for performing data reception and transmission with said user equipment using said uniform RNTI(s) configured in the cell where the carrier aggregation is performed.

The embodiment of the present invention provides a user equipment, comprising:

reception and transmission module, receiving uniform RNTI(s) which said network side configures for said user equipment; performing data reception and transmission with said network side using the uniform RNTI(s) configured in the cell where the carrier aggregation is performed.

In the embodiment of the present invention, base station configures, for a user equipment performing carrier aggregation, user equipment identity. Network side transmits with user equipment according to having configured user equipment identity, making UE which performs carrier aggregation technology to perform data reception and transmission with each cell through RNTI(s). Absolutely, discretionary product which implementing the embodiment of the present invention not necessarily comprises said all features synchronously.

DETAILED DESCRIPTION OF THE EMBODIMENTS OF THE PRESENT INVENTION

For solving said problems of existing technology, in the embodiment of the present invention, base station configures user equipment identity for user equipment which processing carrier aggregation; said base station transmits with user equipment according to user equipment identity which has configured.

Embodiment of this invention will be clearly and completely described with pictures in the following. Apparently, the following embodiment is only a part of this invention, but not the whole invention. All the embodiments achieved by general technical personnel in this field based on this application without creative work belong to the protection scope of the present application.

Figure 1:
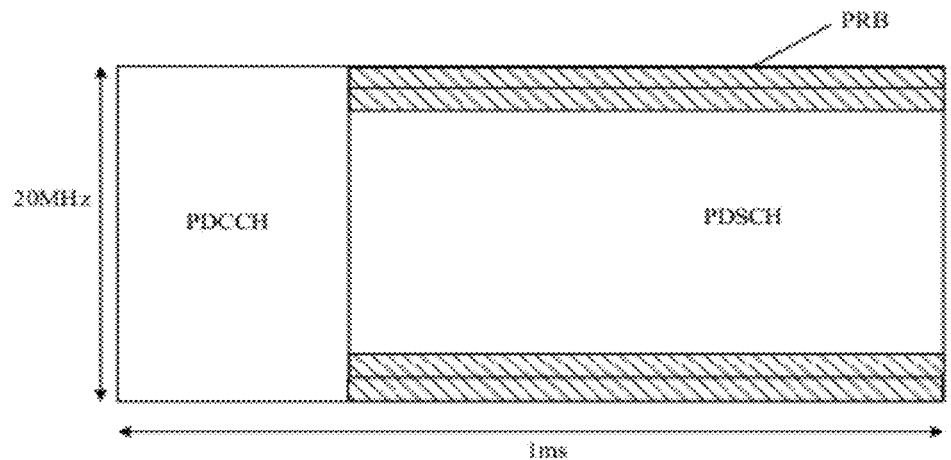
FIG. 1 is a structure diagram of physical layer channel construction indication in existing technology.
Figure 2:
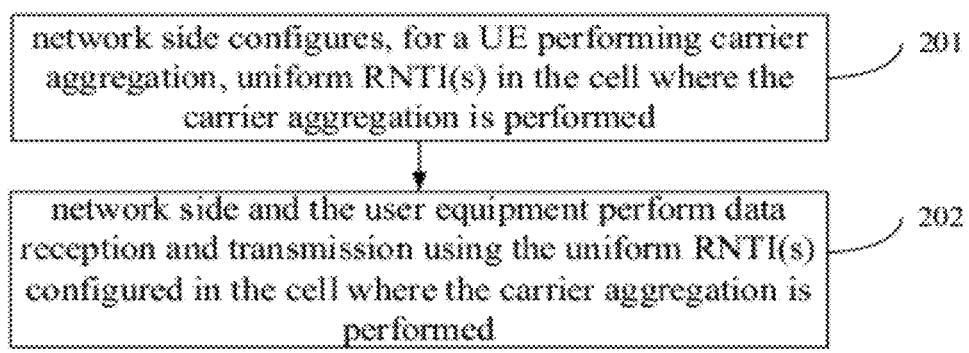
FIG. 2 is a flow diagram of method for using a user equipment identity in embodiment of the present invention.

The embodiment of the present invention provides a method for using a user equipment identity, reference to FIG. 2, comprising the specific steps of:

Step 201, the network side configures, for a UE (User Equipment) performing carrier aggregation, uniform RNTI(s) in the cell where the carrier aggregation is performed;

Step 202, said network side and the user equipment perform data reception and transmission using the uniform RNTI(s) configured in the cell where the carrier aggregation is performed.

In the embodiment of the present invention, network side configures user equipment identity for the user equipment which performing carrier aggregation, and network side transmits with user equipment according to user equipment identity which has configured, making UE which performing carrier aggregation technology performs data reception and transmission with each carrier aggregated cell through RNTI(s).

Network side device comprises base station, eNB and other substance, however, the invention is not limited by these, all the device which configuring uniform RNTI(s) for carrier aggregated cell in network side all should be in the protective range of the present invention. The embodiment of the present invention takes an example that network side device is base station to explain.

Combining specific application scene, explaining the embodiment of the present invention further.

Figure 3:
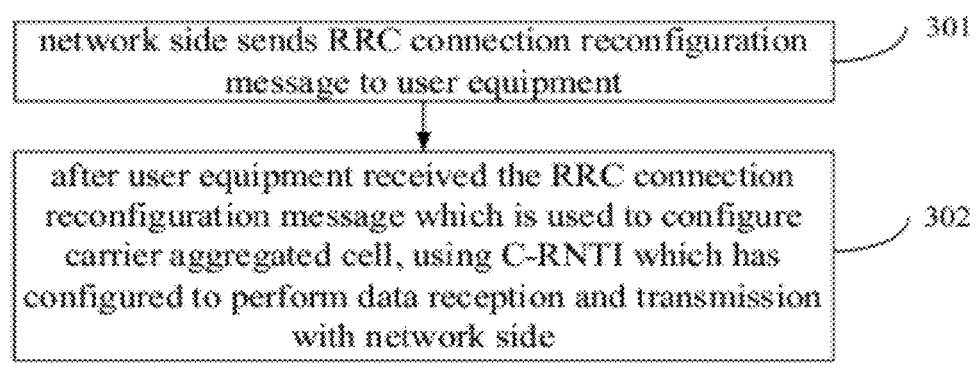
FIG. 3 is a flow diagram of method for using a user equipment identity in other embodiment of the present invention.

Another embodiment of the present invention provides a method to use the user equipment identity, the method describes that UE in connected state how to use C-RNTI and/or SPS C-RNTI when carrier aggregated cells are configuring, reference to FIG. 3, comprising the particular steps of:

Step 301, network side sends RRC connection reconfiguration message to user equipment, the message carries frequency information or frequency index of carrier aggregated cell(s), using to configure carrier aggregated cell for UE.

Step 302, after user equipment received the RRC connection reconfiguration message which is used to configure carrier aggregated cell, using C-RNTI which has configured to perform data reception and transmission with network side in all the cells where the carrier aggregation is performed.

In the embodiment of the present invention, base station configures user equipment identity for user equipment which performing carrier aggregation, and base station transmits with user equipment according to having configured user equipment identity, making UE which performing carrier aggregation technology performs data reception and transmission with each cell through RNTI(s). It's need to indicate further that, carrier aggregation system may further comprise activation process of carrier aggregated cell, namely: after said configuration process has finished, user equipment may not perform data reception and transmission with carrier aggregated cell of network side, user equipment will perform data reception and transmission with carrier aggregated cell which has activated after carrier aggregated cell has been activated. Network side may use RRC signaling to activate carrier aggregated cells for user equipment, or the signaling of other protocol layer, such as MAC CE. When the activation process of carrier aggregation existing, after receiving carrier aggregated cell activation signaling of network side, user equipment uses C-RNTI which has configured to perform data reception and transmission with network side in all the cells where carrier aggregation is performed.

It is need to explain that, SPS C-RNTI has same usage with C-RNTI, UE is configured SPS C-RNTI when only uses way of semi-persistent scheduling.

In the embodiment of the present invention, base station configures user equipment identity for a user equipment performing carrier aggregation, base station transmits with user equipment according to user equipment identity which has configured, making UE which performs carrier aggregation technology to perform data reception and transmission with each cell through RNTI(s).

Figure 4:
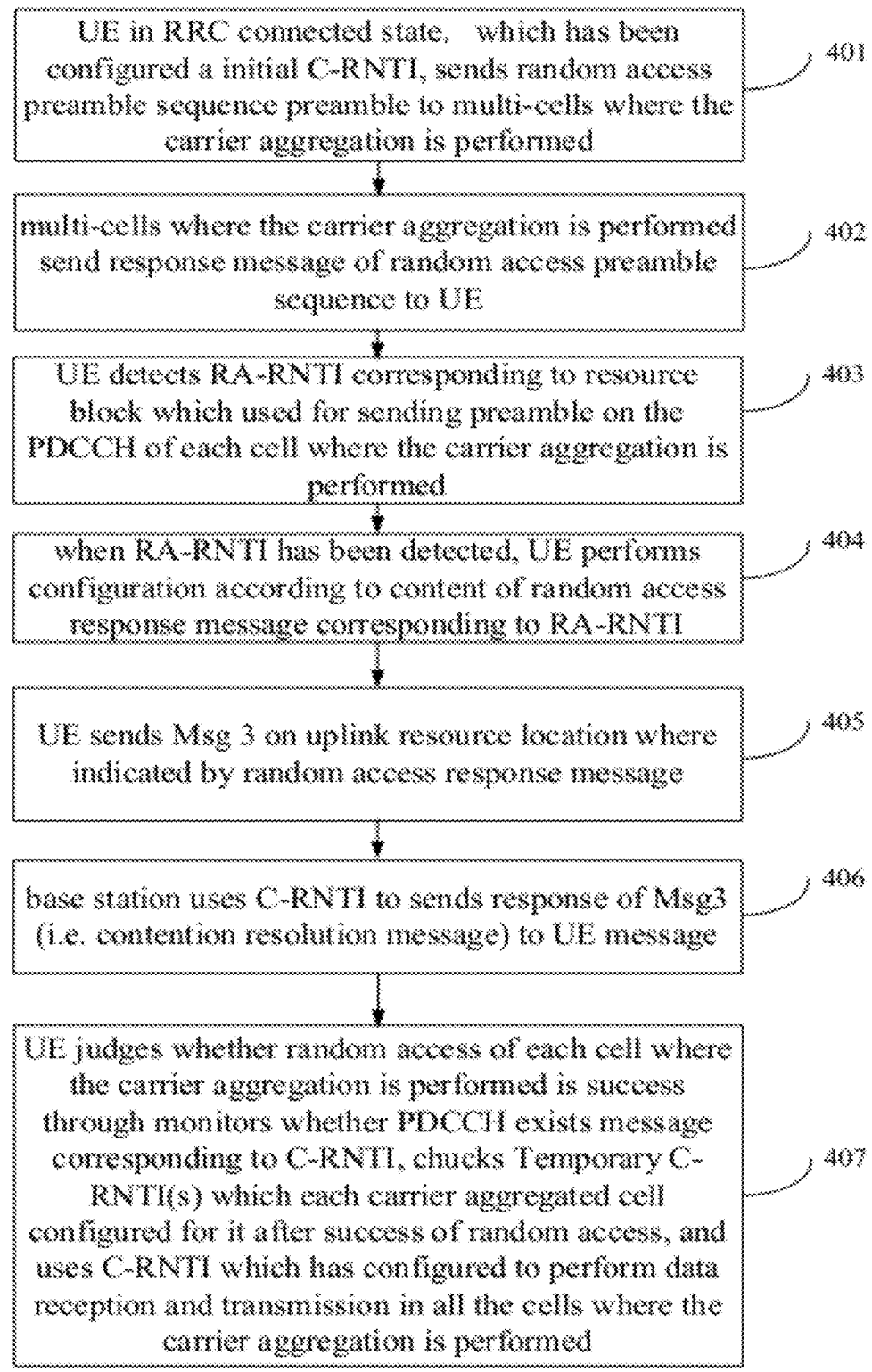
FIG. 4 is a flow diagram of method for using a user equipment identity in other embodiment of the present invention.

Another embodiment of the present invention provides a method for using the user equipment identity, the method describes a process that, UE in connected state uses random access which bases on competition to access other cells where the carrier aggregation is performed. Taking an example that UE accesses other multi-cells where the carrier aggregation is performed simultaneously to explain, reference to FIG. 4, comprising the particular steps of:

Step 401, UE in RRC connected state, which has been configured a initial C-RNTI, sends random access preamble sequence preamble to multi-cells where the carrier aggregation is performed.

Step 402, multi-cells where the carrier aggregation is performed send response message of random access preamble sequence to UE.

Each cell where the carrier aggregation is performed sends response message of random access preamble sequence to UE, the message comprises: configuration information of uplink resource, timing adjustment information, random access preamble sequence identity number, each carrier aggregated cell configured Temporary C-RNTI for UE, and so on.

It is need to explain that, base station configures different Temporary C-RNTI(s) for UE which makes random access between multi-cells where the carrier aggregation is performed synchronously; Temporary C-RNTI configuration of each cell is different from RNTI(s) of current system configuration.

Step 403, UE detects RA-RNTI corresponding to resource block which used for sending preamble on the PDCCH of each cell where the carrier aggregation is performed.

Step 404, when RA-RNTI has been detected, UE performs configuration according to content of random access response message corresponding to RA-RNTI.

Step 405, UE sends Msg 3 on uplink resource location where indicated by random access response message. Msg 3 carries C-RNTI MAC control unit to notifying identity of UE to network for contention resolution.

Step 406, base station uses C-RNTI to sends response of Msg3 (i.e. contention resolution message) to UE message.

Step 407, UE judges whether random access of each cell where the carrier aggregation is performed is success through monitors whether PDCCH exists message corresponding to C-RNTI, chucks Temporary C-RNTI(s) which each carrier aggregated cell configured for it after success of random access, and uses C-RNTI which has configured to perform data reception and transmission in all the cells where the carrier aggregation is performed.

In the embodiment of the present invention, base station configures user equipment identity for carrier aggregation user equipment, base station transmits with user equipment according to having configured user equipment identity, making UE which uses carrier aggregation technology to perform data reception and transmission with each cell through RNTI(s).

Figure 5:
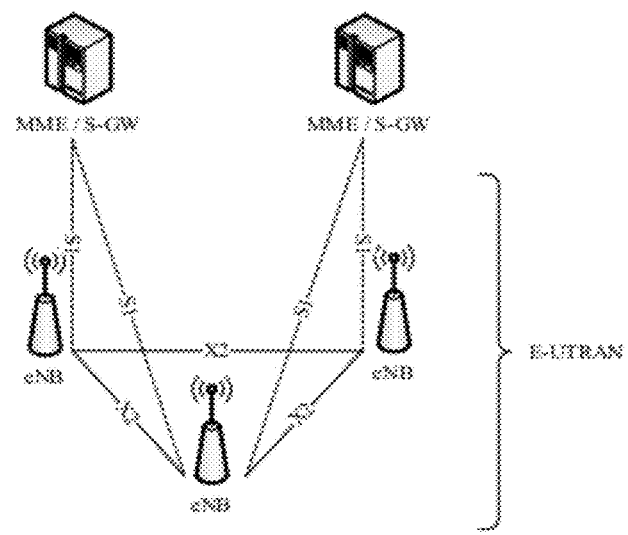
FIG. 5 is a structure diagram of LTE system network architecture in existing technology.

Network architecture of LTE system is shown in FIG. 5. In LTE system, network side substance consists of MME (Mobile Management Entity)/S-GW (Serving Gateway), eNB. The interface is X2 between eNB and eNB, The interface is S1 between MME/S-GW and eNB. In the LTE network, when UE moves from an eNB to other eNB, handover is needed to make current service not to blackout. If there is X2 interface between eNB and eNB, handover process may be implemented through X2 interface; if there is not X2 interface between eNB and eNB, handover process may be implemented through S1 interface.

Figure 6:
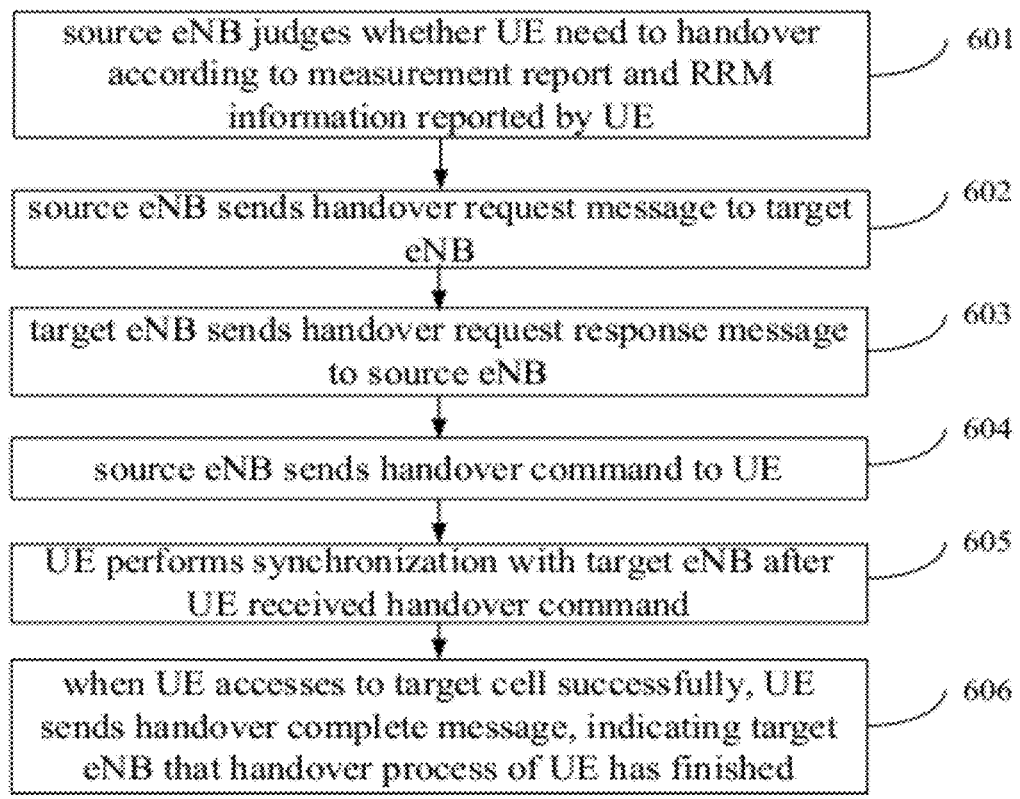
FIG. 6 is a flow diagram of method for using a user equipment identity in other embodiment of the present invention.

Another embodiment of the present invention provides a method for using the user equipment identity, the method describes a process that source eNB and target eNB implement handover through X2 interface, reference to FIG. 6, comprising the particular steps of:

Step 601, source eNB judges whether UE need to handover according to measurement report and RRM (Radio Resource Management) information reported by UE.

Step 602, source eNB sends handover request message to target eNB.

Source eNB sends handover request message to target eNB, the handover request message takes necessary message that UE needs to make handover preparation to target eNB, for example: context message of UE in source eNB, target cell ID and so on.

Step 603, target eNB sends handover request response message to source eNB.

When resource which used by handover UE is approved at target eNB, target cell will configure corresponding resource for the UE, and send handover request response message to source eNB. Handover request response message comprises necessary parameters information which UE needs to make handover to target eNB, for example: the RNTI(s) which target eNB configures for UE, system information of target eNB, preamble information when UE makes random access at target eNB.

If target eNB configures carrier aggregated cell for UE right now, since UE uses the same C-RNTI, SPS C-RNTI, and conducts transmission power control through TPC-PUSCH-RNTI(s) and TPC-PUCCH-RNTI(s). Accordingly, the handover request response message should include the C-RNTI, SPS C-RNTI, TPC-PUSCH-RNTI(s) and TPC-PUCCH-RNTI(s) which target eNB configures for UE, and frequency information or frequency index of the carrier aggregated cell. Since UE uses same C-RNTI, SPS C-RNTI (TPC-RNTI) to perform data reception and transmission in all cells where carrier aggregation is performed, accordingly, taking only one C-RNTI (and SPS C-RNTI). Since UE may use the same or respective TPC-PUSCH-RNTI(s) and TPC-PUCCH-RNTI(s) in different cells where carrier aggregation is performed, accordingly, the number of TPC-PUSCH-RNTI(s) and TPC-PUCCH-RNTI(s) will be determined on a case-by-case basis. If all cells where carrier aggregation is performed use same TPC-PUSCH-RNTI and TPC-PUCCH-RNTI, then takes only one TPC-PUSCH-RNTI and TPC-PUCCH-RNTI; if all cells where carrier aggregation is performed use different TPC-PUSCH-RNTIs and TPC- PUCCH-RNTIs, then takes TPC-PUSCH-RNTIs and TPC-PUCCH-RNTIs corresponding to respective cells where carrier aggregation is performed. Whether handover request response message comprises SPS C-RNTI, TPC-PUSCH-RNTI(s) and TPC-PUCCH-RNTI(s) will be determined on a case-by-case basis. Taking no SPS C-RNTI if target eNB don't configure Semi-Persistent Scheduling resource for UE. TPC-PUSCH-RNTI(s) and TPC-PUCCH-RNTI(s) may also be sent by dedicated signaling when UE has entered handover target cell.

Step 604, source eNB sends handover command to UE.

Source eNB sends handover command to UE after source eNB received the handover request response message from target eNB, indicating UE switch to target eNB. The handover command which source eNB sends to UE is comprised by handover request response message which target eNB sends to source eNB. Handover command comprises said necessary parameters information of step 603 when UE switches to target eNB.

Step 605, UE performs synchronization with target eNB after UE received handover command.

Step 606, when UE accesses to target cell successfully, UE sends handover complete message, indicating target eNB that handover process of UE has finished.

It is need to explain that the handover process through S1 interface is similar between handover process through X2, the difference is that source eNB communicates with target eNB through MME, no more tautology here.

In the embodiment of the present invention, base station configures user equipment identity for user equipment performing carrier aggregation, base station transmits with user equipment according to having configured user equipment identity, so as to make UE which uses carrier aggregation technology to perform data reception and transmission with each cell through RNTI(s).

Figures 7, 8:
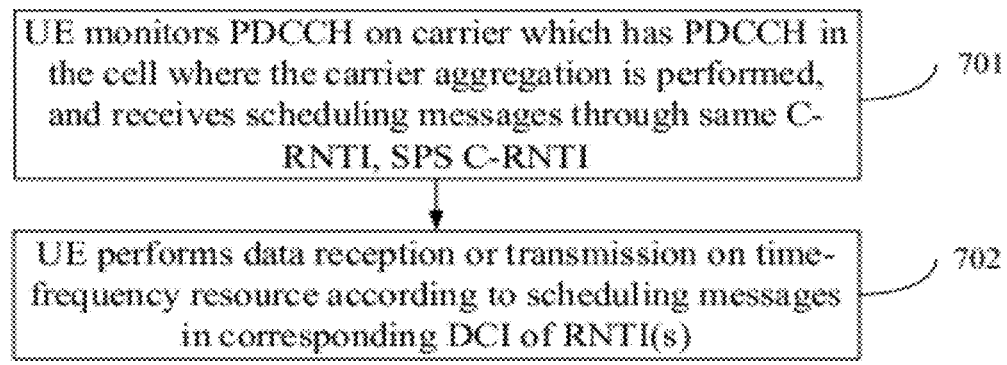
FIG. 7 is a flow diagram of method for using a user equipment identity in other embodiment of the present invention.
FIG. 8 is a configuration diagram of UE RNTI(s) in the cell where carrier aggregation is performed in embodiment of the present invention.

Another embodiment of the present invention provides a method for using the user equipment identity, reference to FIG. 7, comprising the specific steps of:

Step 701, UE monitors PDCCH on carrier which has PDCCH in the cell where the carrier aggregation is performed, and receives scheduling messages through same C-RNTI, SPS C-RNTI.

Reference to FIG. 8, it is a configuration diagram of UE RNTI(s) in the cell where carrier aggregation is performed. The figure shows that each UE uses same C-RNTI and SPS C-RNTI in cells of the aggregated carriers, for example, C-RNTI of UE2 is 0011, SPS C-RNTI is 0019 in cell2 and cell3 where the carrier aggregation is performed.

Step 702, UE performs data reception or transmission on time-frequency resource according to scheduling messages in corresponding DCI of RNTI(s).

In the embodiment of the present invention, base station configures user equipment identity for user equipment performing carrier aggregation, base station transmits with user equipment according to having configured user equipment identity, making UE which uses carrier aggregation technology performs data reception and transmission with each cell through RNTI(s).

The embodiment of the present invention provides a system for using user equipment identity, comprising:

Network side, configuring, for a UE performing carrier aggregation, uniform RNTI(s) in the cell where the carrier aggregation is performed; performing data reception and transmission with UE using the uniform RNTI(s) configured in the cell where the carrier aggregation is performed.

UE, receiving uniform RNTI(s) which network side configures for UE; performing data reception and transmission with network side using the uniform RNTI(s) configured in the cell where the carrier aggregation is performed.

Figure 9:
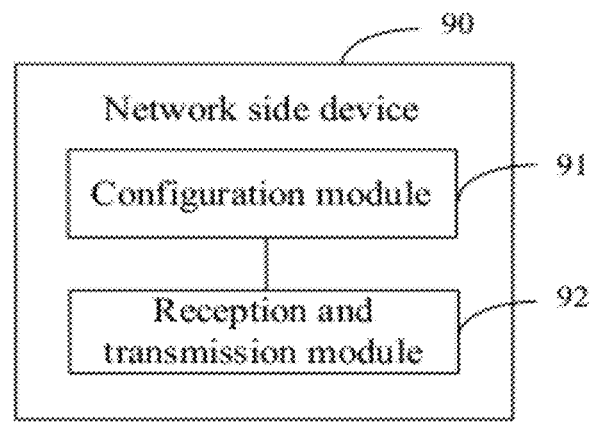
FIG. 9 is a network side device in embodiment of the present invention.
Figure 10:
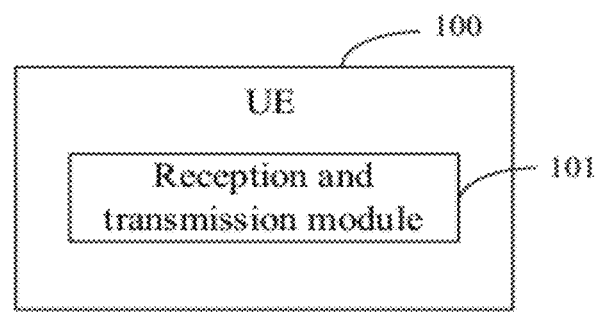
FIG. 10 is a user equipment in embodiment of the present invention.

The embodiment of the present invention provides a network side device 90, reference to FIG. 9, comprising:

Configuration module 91, is used for configuring, for a UE performing carrier aggregation, a uniform RNTI(s) in cell where the carrier aggregation is performed;

Reception and transmission module 92, is used for performing data reception and transmission with UE using said uniform RNTI(s) configured in the cell where the carrier aggregation is performed.

Configuring uniform RNTI(s), comprising:

Cell where the carrier aggregation is performed share RNTI(s) resource.

Configuration module 91 is used for:

Network side configuring a uniform C-RNTI, and/or SPS C-RNTI, and/or TPC-PUSCH-RNTI(s), and/or TPC-PUCCH-RNTI(s) for UE in the cell where the carrier aggregation being performed.

Comprising:

Network side configures same C-RNTI for UE in the different cells where the carrier aggregation is performed. The C-RNTI which configures is different from RNTI(s) which network side has configured; and/or, network side configures same SPS C-RNTI for UE in the different cells where the carrier aggregation is performed, the SPS C-RNTI which configures is different form RNTI(s) which network side has configured.

Comprising:

Network side configures same or different TPC-PUSCH-RNTI(s) for UE in the different cells where the carrier aggregation is performed, the TPC-PUSCH-RNTI(s) which configures is different from RNTI(s) which network side has configured; and/or network side configures same or different TPC-PUCCH-RNTI(s) for UE in the different cells where the carrier aggregation is performed, said TPC-PUCCH-RNTI(s) which configures is different from RNTI(s) which network side has configured.

When multi-cells where the carrier aggregation is performed exist random access synchronously, configuration module 91 is specifically used for:

Configuring different Temporary C-RNTI(s) for UE which making random access synchronously in multiple cells where the carrier aggregation is performed; Temporary C-RNTI(s) which configures is different from RNTI(s) which network side has configured.

Reception and transmission module is used for:

Network side performing data reception and transmission with said user equipment using same C-RNTI and/or SPS C-RNTI in the different cells where the carrier aggregation being performed.

Reception and transmission module is also used for:

Said network side sending power control message to UE using TPC-PUSCH-RNTI(s) and TPC-PUCCH-RNTI(s) configured in the cells where the carrier aggregation being performed.

Comprising:

Network side doesn't configure new C-RNTI(s) and/or SPS C-RNTI(s) for UE when configures the carrier aggregation; and/or, network side doesn't configure new C-RNTI(s) and/or SPS C-RNTI(s) for UE when configures and activates the carrier aggregation;

UE and said network side perform data reception and/or transmission using the C-RNTI and/or SPS C-RNTI which have configured in all the cells where the carrier aggregation is performed.

When said user equipment switches from network side source node to network side target node, comprising:

Network side target node sends handover request response message to network side source node, the handover request response message comprises that network side configured, for UE, RNTI(s) and the frequency information or frequency index of other cells for carrier aggregation.

Network side source node sends handover request response message to UE, the handover request response message comprises that network side target node configured, for UE, said RNTI(s) and the frequency information or frequency index of other cells for carrier aggregation.

Network side target node configures, for UE, said RNTI(s), comprising:

Network side target node configures, for UE, a sole C-RNTI and/or SPS C-RNTI.

When UE is in RRC connected state, comprising:

UE makes random access to the cell where the carrier aggregation is performed, after contention resolution, UE uses C-RNTI which has been configured to perform data reception/transmission, chucks Temporary C-RNTI(s) configured by cell where the carrier aggregation is performed.

The embodiment of the present invention provides a UE 100, reference to 10, comprising:

Reception and transmission module 101, receiving uniform RNTI(s) which network side configures for UE; performing data reception and transmission with network side using the uniform RNTI(s) configured in the cell where the carrier aggregation is performed.

Comprising:

UE monitors the PDCCH of the carrier which have PDCCH in the cell where the carrier aggregation is performed; using same C-RNTI and/or SPS C-RNTI to receive scheduling message.

Comprising:

UE monitors the PDCCH of the carrier which the carrier has PDCCH in the cell where the carrier aggregation is performed; uses TPC-PUSCH-RNTI(s) and/or TPC-PUCCH-RNTI(s) configured to receive scheduling message.

The embodiment of the present invention, the network side configures, for a user equipment performing carrier aggregation, user equipment identity, and network side transmits with user equipment according to user equipment identity configured, thereby, UE which using carrier aggregation technology performs data reception and transmission with each cell through RNTI(s). Absolutely, discretionary product which implementing the embodiment of the present invention not necessarily comprises said all features synchronously.

It should be explained that, said embodiment of the present invention describes using way of RNTI(s) through UE, but the technical personnel in this field can understand that, other user equipment, such as machine communication equipment, should be as the protection scope of the present invention.

It also should be explained that, said embodiment of the present invention makes a example that using way of RNTI(s) to describe, but the technical personnel in this field can understand that, in other system or standard, identity which has same or similar function or action with the RNTI(s) of the present invention embodiment should be as the protection scope of the present invention.

Through the description of the embodiments above, the technical personnel in this field can understand clearly that the present invention can be implemented by software and necessary current hardware platform. Of course, it also can be implemented by hardware, but in many situations the former is the better. Based on this understanding, essence or section with contribution to existing technology of the technical program of the present invention can be embodied by a form of software product which can be stored in a storage medium, comprising a number of instructions for making a computer device (such as mobile phone, personal computers, servers, or network equipments, etc.) implement the methods described in the embodiments of the present invention.

The descriptions above are just preferred implement ways of the present invention. It should be pointed that, for general technical personnel in this field, some improvement and decorating can be done, which should be as the protection scope of the present invention.

The invention claimed is:

1. A method for using a user equipment identity, comprising:
   configuring, for a user equipment performing carrier aggregation, uniform radio network temporary identity RNTI(s) in cells where the carrier aggregation is performed;
   the network side and the user equipment performing data reception and transmission using the uniform RNTI(s) configured in the cells where the carrier aggregation is performed,
   wherein the network side configuring, for the user equipment performing carrier aggregation, the uniform RNTI(s) comprises:
   the network side configuring a same C-RNTI for the UE in the different cells where the carrier aggregation is performed, the same C-RNTI is different from RNTI(s) which the network side configured for another UE and/or other RNTI(s) which the network side configured for the UE; or
   the network side not configuring a new C-RNTI(s) for UE when the network side configures the carrier aggregation or when the network side configures and activates the carrier aggregation.

2. The method of claim 1, wherein said configuring uniform RNTI(s) is performed by:
   said cells where the carrier aggregation is performed sharing RNTI resource.

3. The method of claim 1, wherein, configuring, for a user equipment performing carrier aggregation, uniform RNTI(s), comprising:
   said network side configuring, for said user equipment, uniform C-RNTI(s), and/or SPS C-RNTI(s), and/or TPC-PUSCH-RNTI(s), and/or TPC-PUCCH-RNTI(s) in the cells where the carrier aggregation is performed.

4. The method of claim 3, wherein, said network side configuring uniform SPS C-RNTI for said user equipment in the cells where the carrier aggregation is performed, comprising:
   said network side configuring a same SPS C-RNTI for the user equipment in the different cells where the carrier aggregation is performed, the SPS C-RNTI being different from RNTI(s) which network side configured for another UE and/or other RNTI(s) which the network side configured for the UE.

5. The method of claim 3, wherein, said network side configuring, for said user equipment, uniform TPC-PUSCH-RNTI(s) in the cells where the carrier aggregation is performed, comprises:
   configuring, for the user equipment, a same or different TPC-PUSCH-RNTI(s) in the different cells where the carrier aggregation is performed, the TPC-PUSCH-RNTI(s) being different from RNTI(s) which said network side configured for another UE and/or other RNTI(s) which the network side configured for the UE, said network side configuring, for said user equipment, uniform TPC-PUCCH-RNTI(s) in the cells where the carrier aggregation is performed, comprising: said network side configuring, for the user equipment, a same or different TPC-PUCCH-RNTI(s) in the different cells where the carrier aggregation is performed, the TPC-PUCCH-RNTI(s) being different from RNTI(s) which network side configured for another UE and/or other RNTI(s) which the network side configured for the UE.

6. The method of claim 1, wherein, said network side and said user equipment performing data reception and transmission using said uniform RNTI configured in the cells where the carrier aggregation is performed, comprising:
said network side performing data reception and transmission with said user equipment using the same C-RNTI and/or SPS C-RNTI in the different cells where the carrier aggregation is performed.

7. The method of claim 1, wherein, said network side and said user equipment performing data reception and transmission using said uniform RNTI(s) configured in the cells where the carrier aggregation is performed, comprising:
said network side sending a power control message to said user equipment using TPC-PUSCH-RNTI(s) and TPC-PUCCH-RNTI(s) configured in the cells where the carrier aggregation is performed.

8. The method of claim 1, wherein:
said network side doesn't configure new C-RNTI(s) and/or SPS C-RNTI(s) for said user equipment when configures the carrier aggregation; and/or, network side doesn't configure new C-RNTI(s) and/or SPS C-RNTI(s) for said user equipment when configures and activates the carrier aggregation;
said network side and the user equipment performing data reception and transmission using the uniform RNTI(s) configured in the cells where the carrier aggregation is performed, said user equipment and said network side performing data reception and/or transmission using the C-RNTI and/or SPS C-RNTI which have been configured in all the cells where the carrier aggregation is performed.

9. The method of claim 1, wherein, said network side and the user equipment performing data reception and transmission using the uniform RNTI configured in the cells where the carrier aggregation is performed, comprises:
said user equipment monitoring PDCCH of the carrier which has the PDCCH in the cells where the carrier aggregation is performed; and using the same C-RNTI and/or same SPS C-RNTI to receive a scheduling message.

10. The method of claim 1, wherein, said network side and said user equipment performing data reception and transmission using the uniform RNTI(s) configured in the cells where the carrier aggregation is performed, comprising:
said user equipment monitoring PDCCH of the carrier which has the PDCCH in the cells where the carrier aggregation is performed; using TPC-PUSCH-RNTI(s) and/or TPC-PUCCH-RNTI(s) configured to receive a transmission power control message.

11. The method of claim 1, wherein, when said user equipment switches from a network side source node to a network side target node, the network side configuring, for a user equipment performing carrier aggregation, a uniform RNTI(s) in the cells where the carrier aggregation is performed, comprising:
said network side target node sending a handover request response message to said network side source node, the handover request response message comprising said RNTI(s) which the network side target node configured for said user equipment, and a frequency information or frequency index of other cells where the carrier aggregation is performed;
said network side source node sending the handover request response message to said user equipment, the handover request response message comprising said RNTI(s) which the network side target node configured, for said user equipment, and a frequency information or frequency index of other cells where the carrier aggregation is performed.

12. The method of claim 11, wherein, said network side target node configuring, for said user equipment, said RNTI(s), comprising:
said network side target node configuring, for said user equipment, a sole C-RNTI and/or SPS C-RNTI.

13. A system for using a user equipment identity, comprising:
a network side, configuring, for a user equipment performing carrier aggregation, uniform RNTI(s) in the cells where the carrier aggregation is performed;
performing data reception and transmission with said user equipment using the uniform RNTI(s);
the user equipment, receiving the uniform RNTI(s) which said network side configures for said user equipment and performing data reception and transmission with said network side using the uniform RNTI(s),
wherein the network side configuring, for the user equipment performing carrier aggregation, the uniform RNTI(s) comprises:
the network side configuring a same C-RNTI for the UE in the different cells where the carrier aggregation is performed, the same C-RNTI is different from RNTI(s) which the network side configured for another UE and/or other RNTI(s) which the network side configured for the UE; or
the network side not configuring a new C-RNTI(s) for UE when the network side configures the carrier aggregation or when the network side configures and activates the carrier aggregation.

14. A network side device, comprising:
a configuration processor, for configuring, for a user equipment performing carrier aggregation, uniform RNTI(s);
a transceiver, for performing data reception and transmission with said user equipment using said uniform RNTI(s) configuration in the cells where the carrier aggregation is performed,
wherein the network side configuring, for the user equipment performing carrier aggregation, the uniform RNTI(s) comprises:
the network side configuring a same C-RNTI for the UE in the different cells where the carrier aggregation is performed, the same C-RNTI is different from RNTI(s) which the network side configured for another UE and/or other RNTI(s) which the network side configured for the UE; or
the network side not configuring a new C-RNTI(s) for UE when the network side configures the carrier aggregation or when the network side configures and activates the carrier aggregation.

15. The network side device of claim 14, wherein, the configuration processor configuring uniform RNTI(s), comprising:

said cells where the carrier aggregation is performed sharing RNTI resource.

16. The network side device of claim 14, wherein, the configuration processor configured to:
Configure, for said user equipment, uniform C-RNTI, and/or SPS C-RNTI, and/or TPC-PUSCH-RNTI(s), and/or TPC-PUCCH-RNTI(s) in the cells where the carrier aggregation being performed.

17. The network side device of claim 16, wherein the configuration processor is configured to configure, for user equipment, the same SPS C-RNTI in the different cells where the carrier aggregation is performed, the SPS C-RNTI is different from RNTI(s) which the network side configured for another UE and/or other RNTI(s) which the network side configured for the UE.

18. The network side device of claim 16, wherein, the configuration processor is configured to configure, for user equipment, the same or different TPC-PUSCH-RNTI(s) in the different cells where the carrier aggregation is performed, said TPC-PUSCH-RNTI(s) is different from RNTI(s) which the network side configured for another UE and/or other RNTI(s) which the network side configured for the UE;
the configuration processor is configured to configure, for the user equipment, same or different TPC-PUCCH-RNTI(s) in the different cells where the carrier aggregation is performed, said TPC-PUCCH-RNTI(s) is different from RNTI(s) which network side configured for another UE and/or other RNTI(s) which the network side configured for the UE.

19. The network side device of claim 14, said transceiver is configured to:
Perform data reception and transmission with said user equipment using same C-RNTI and/or SPS C-RNTI in the different cells where the carrier aggregation is performed.

20. The network side device of claim 14, wherein, said transceiver is configured to:
Send a power control message to said user equipment using TPC-PUSCH-RNTI(s) and TPC-PUCCH-RNTI(s) which has been configured in the cells where the carrier aggregation is performed.

21. The network side device of claim 14, wherein,
the configuration processor configures, C-RNTI(s) and/or SPS C-RNTI(s) for said user equipment; and/or, when configuring and activating the carrier aggregation, said configuring module doesn't configure new C-RNTI(s) and/or SPS C-RNTI(s) for said user equipment; and
said transceiver is configured to perform data reception and/or transmission with said user equipment using the C-RNTI and/or SPS C-RNTI configured in all the cell said network configuring, for said user equipment, uniform TPC-PUCCH-RNTI(s) in the cell where the carrier aggregation is performed, comprising: said network side configuring; for user equipment, the same or different TPC-PUCCH-RNTI(s) in the different cells where the carrier aggregation is performed, the TPC-PUCCH-RNTI(s) being different from RNTI(s) which network side configured for another UE and/or other RNTI(s) which the network side configured for the UE.

22. The network side device of claim 14, wherein: said user equipment switches:
from a network side source node to a network side target node, if said network side device is the network side target node, said network side device is also used for: sending the handover request response message to the network side source node, the handover request response message comprising said RNTI(s) which the network side configured for said user equipment, and a frequency information or frequency index of other cells where the carrier aggregation is performed;
if said network side device is the network side source node, said network side device is also used for: sending the handover request response message to said user equipment, the handover request response message comprising said RNTI(s) which the network side target node configured for said user equipment, and a frequency information or frequency index of other cells where the carrier aggregation is performed.

23. The network side device of claim 22, wherein, the configuration processor is configured to: configure, for said user equipment, a sole C-RNTI and/or SPS C-RNTI.

* * * * *